United States Patent [19]

Noguchi et al.

[11] Patent Number: 5,050,850
[45] Date of Patent: Sep. 24, 1991

[54] ELECTRORHEOLOGICAL ANTI-VIBRATION BUSH

[75] Inventors: Takeshi Noguchi; Tatsuro Ishiyama, both of Yokohama, Japan

[73] Assignee: Bridgestone Corporation, Tokyo, Japan

[21] Appl. No.: 574,523

[22] Filed: Aug. 28, 1990

Related U.S. Application Data

[63] Continuation of Ser. No. 316,573, Feb. 28, 1989, abandoned, which is a continuation of Ser. No. 95,312, Sep. 11, 1987, abandoned.

[30] Foreign Application Priority Data

Sep. 16, 1986 [JP] Japan ................... 61-217646

[51] Int. Cl.⁵ ................................. F16F 7/00
[52] U.S. Cl. ........................ 267/140.1; 188/267
[58] Field of Search ............ 267/219, 140.1 C, 293, 267/35, 113, 140.1 AE, 140.1 E, ; 188/267; 180/300, 312; 248/562, 635, 636, 638

[56] References Cited

U.S. PATENT DOCUMENTS

| 2,886,151 | 5/1959 | Winslow | 192/21.5 |
| 3,047,507 | 7/1962 | Winslow | 192/21.5 X |
| 4,630,806 | 12/1986 | Dan et al. | 267/140.1 |
| 4,630,808 | 12/1986 | Ushijima et al. | 267/140.1 |
| 4,702,346 | 10/1987 | Uno et al. | 267/140.1 X |
| 4,733,758 | 3/1988 | Duclos et al. | 188/267 |

FOREIGN PATENT DOCUMENTS

| 0209145 | 7/1986 | European Pat. Off. . |
| 3336965 | 5/1985 | Fed. Rep. of Germany . |
| 0164242 | 12/1981 | Japan | 267/121 |
| 57-129944 | 8/1982 | Japan . |
| 58-203242 | 11/1983 | Japan . |
| 0164428 | 9/1984 | Japan | 267/140.1 |
| 0139507 | 7/1985 | Japan | 248/562 |
| 0002937 | 1/1986 | Japan | 267/140.1 |
| 756107 | 8/1956 | United Kingdom . |

Primary Examiner—Robert J. Oberleitner
Assistant Examiner—Josie A. Ballato
Attorney, Agent, or Firm—Oliff & Berridge

[57] ABSTRACT

An anti-vibration bush comprises: an outer casing adapted to be mounted on either a vibration generating member or a vibration receiving member; a shaft disposed in the outer casing and adapted to be mounted on the other member; and an elastic member disposed between the outer casing and the shaft and having a plurality of small liquid chambers filled with electrorheologic fluid. Electrodes for electrically activating the electrorheologic fluid are provided in a restricted path which permits the small liquid chambers to be in communication with each other. The electrical activation of the electrodes causes the fluid's viscosity to vary, so that the resistance to flow of the fluid passing through the restricted path is changed.

16 Claims, 16 Drawing Sheets

ELECTRORHEOLOGICAL ANTI-VIBRATION BUSH

This is continuation of application Ser. No. 07/316,573 filed Feb. 28, 1989 which in turn is a continuation of 07/095,312 filed Sept. 11, 1987, both applications now abandoned.

BACKGROUND OF THE INVENTION

This invention relates to an anti-vibration bush adapted to be used for industrial machines, automobiles and so forth to absorb vibrations.

An anti-vibration bush used for industrial machines, automobiles and so forth is disposed between a vibration generating member and a vibration receiving member. The anti-vibration bush has an outer casing, a shaft, and rubber therebetween. The rubber restricts relative translation and relative rotation between the outer casing and the shaft to absorb vibrations.

In addition, an improved anti-vibration bush is known and used, and has the following features: the interior of the rubber is divided into a plurality of small liquid chambers; these liquid chambers are sealingly filled with water or the like; and these liquid chambers are in communication with each other through orifices so that vibrations are absorbed by the resistance against flow of the water or the like passing through the orifices when vibrations are generated (See Japanese Patent Unexamined Publication No. 203242/1983).

However, such a conventional anti-vibration bush has a problem in that, although vibrations of an expected frequency can be absorbed, vibrations of different frequencies cannot sufficiently be absorbed because of the constant dimensions of the orifice. To solve this problem, some anti-vibration bushes have restricted paths which can be opened and closed. Such an anti-vibration bush, however, cannot absorb vibrations over a wide range of frequencies.

SUMMARY OF THE INVENTION

Taking account of the facts described above, it is an object of the present invention to provide an anti-vibration bush which enables vibrations over a wide range of frequencies to be absorbed.

An anti-vibration bush according to the present invention comprises: an outer casing adapted to be mounted on either a vibration generating member or a vibration receiving member; a shaft adapted to be mounted on the other member; an elastic member disposed between the outer casing and the shaft and having an interior divided into a plurality of small liquid chambers; an electrorheologic fluid which fills the small liquid chambers and which has a viscosity that varies with an applied electric field; a restricted path enabling the small liquid chambers to be in communication with each other; and electrodes provided in the restricted path to electrically activate the electrorheologic fluid.

An electrorheologic fluid is disclosed in, for example, U.S. Pat. Nos. 2,886,151 and 3,047,507. It has the property of having a viscosity which increases as the intensity of an electric field applied thereto increases.

An example of an electrorheologic fluid is a mixture consisting of 40 to 60 wt % of silicic acid, 30 to 50 wt % of a low-boiling point organic phase of lower boiling point 50 to 10 wt % of water, and 5 wt % of a dispersion medium. Alternatively, or isododekan may be used as the electrorheologic fluid.

Accordingly, the present invention with electrically inactivated electrodes can absorb vibrations by the resistance to flow of the liquid passing through the restricted path in the loaded conditions, like in the conventional anti-vibration bush. When the electrodes receive different electric field intensities, the viscosity of the electrorheologic fluid varies with the electric field applied thereto, so that the resistance to flow of the liquid through the restricted path is changed so as to absorb vibrations having different frequencies.

DESCRIPTION OF THE PREFERRED EMBODIMENTS

Figure 1:
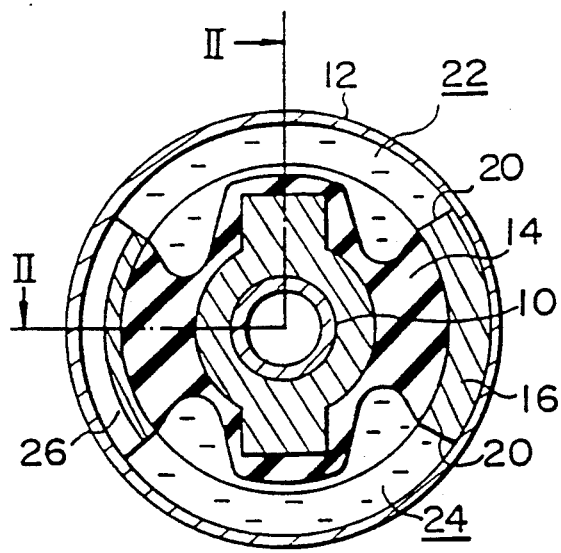
FIG. 1 is a transverse sectional view showing an anti-vibration bush according to one embodiment of the present invention (corresponding to a sectional view taken along line I—I of FIG. 2)
Figure 2:
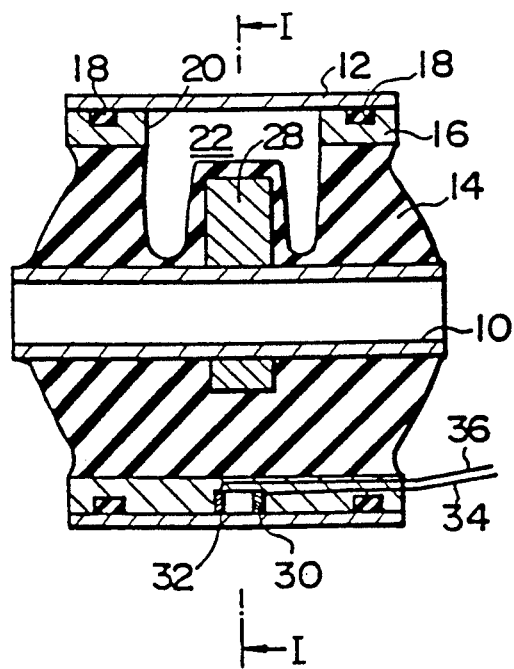
FIG. 2 is a sectional view taken along line II—II of FIG. 1.
Figure 3:
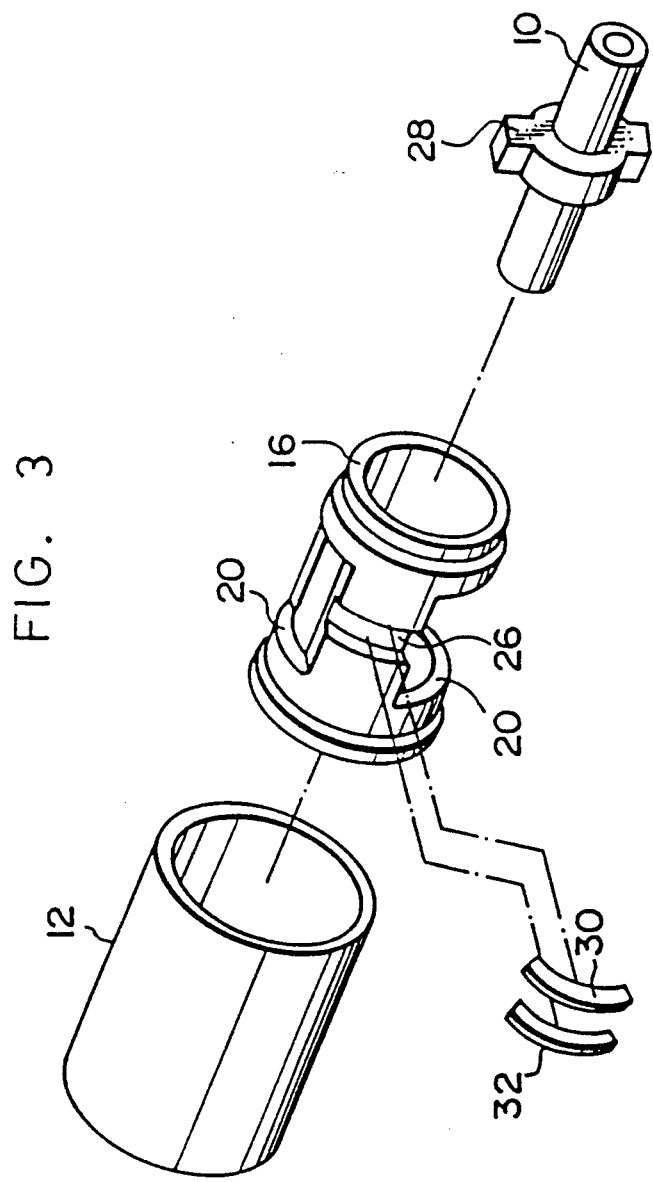
FIG. 3 is an exploded perspective view showing an essential portion of FIG. 1 (an elastic member is omitted)

FIGS. 1 to 3 show an anti-vibration bush according to a first embodiment of the present invention.

This anti-vibration bush has a hollow shaft 10 adapted to be fixed to a base (not shown) and an outer casing 12 disposed coaxially with the shaft 10, the outer casing 12 being adapted to be mounted on an industrial machine or the like which is the source of vibrations.

A cylindrical elastic member 14 made of rubber or the like is bonded by vulcanization onto the outer periphery of the shaft 10. The outer periphery of the elastic member 14 is in turn vulcanized to the inner periphery of an intermediate cylinder 16. The intermediate cylinder 16 is press-fitted into the outer casing 12, so that the elastic member 14 is installed substantially between the shaft 10 and the outer casing 12 to support the outer casing 12 around the shaft 10. It is preferable in this first embodiment that the outer casing 12 be made of an electrically insulating material. The intermediate cylinder 16 is provided on its outer periphery with an O-ring 18 to obtain reliable sealing between the intermediate cylinder 16 and the outer casing 12.

The intermediate cylinder 16 is formed with a pair of openings 20 disposed diametrically opposite to each other. Further, the elastic member 14 is recessed in its outer periphery at portions adjacent to the openings 20, so that small liquid chambers 22 and 24 are defined in the inside of the outer casing 12. The small liquid chambers 22 and 24 are filled with an electrorheologic fluid.

The intermediate cylinder 16 is further formed in its outer periphery with a groove permitting the pair of openings 20 to be in communication with each other, the groove defining a restricted path 26 between itself and the inner periphery of the outer casing 12. Thus, this restricted path 26 permits the pair of small liquid chambers 22 and 24 to be in communication with each other.

Onto the outer periphery of the shaft 10 is fixed a stopper 28 whose outer periphery is covered with part of the elastic member 14. Accordingly, the stopper 28 functions to limit relative radial displacement between the shaft 10 and the outer casing 12 to a predetermined amount.

The restricted path 26 is provided on its side walls with electrode plates 30 and 32 which are disposed to face each other in the restricted path 26. The distance between the electrode plates 30 and 32 is preferably about 1 mm.

The electrode plates 30 and 32 are connected via lead wires 34 and 36 to a control circuit and a power supply (both not shown). The lead wires 34 and 36 pass through the inside of the intermediate cylinder 16. Accordingly, it is preferable that part or all of the intermediate cylinder 16 be made of an electrically insulating material such as a synthetic resin or ceramic, or that the lead wires 34 and 36 be covered with an insulating coating.

When the shaft 10 and the outer casing 12 are mounted onto the base and the industrial machine (both not shown), the thus structured anti-vibration bush of this embodiment acts in such a manner that vibrations are transmitted from the outer casing 12 through the intermediate cylinder 16 to the elastic member 14 which absorbs the vibrations by the internal friction of the elastic member 14.

In addition, the vibrations cause the fluid in the small liquid chambers 22 and 24 to flow through the restricted path 26, so that the vibrations are also absorbed by the resistance to flow of the fluid through the restricted path 26.

Furthermore, when a voltage is applied to the electrode plates 30 and 32 through the lead wires 34 and 36, the electric field intensity is increased with the magnitude of the voltage, so that the viscosity of the electrorheologic fluid in the restricted path 26 is gradually increased to lower the resonance frequency of the fluid. Thus, the resistance to flow through the restricted path 26 can be varied from one value when the electrode plates are inactivated to another value when the fluid in the restricted path 26 is completely solidified (when the dynamic spring constant is increased), that is, when the restricted path 26 is blocked. Accordingly, the flow resistance can be controlled to absorb vibrations over a wide range of frequencies.

Assuming that, for example, the frequency of shimmy generation is 17–18 Hz, the voltage should be increased so that mainly vibrations with frequencies around this frequency are damped.

Thus, the anti-vibration bush according to the first embodiment can have its spring constant varied to contribute to the improvement of the comfort and the driving stability of the vehicle.

Figure 4:
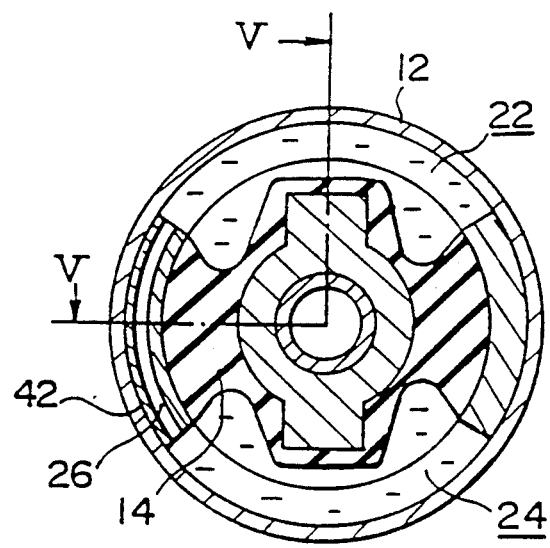
FIG. 4 is a transverse sectional view showing a second embodiment of the invention (corresponding to a sectional view taken along line IV—IV of FIG. 5)
Figure 5:
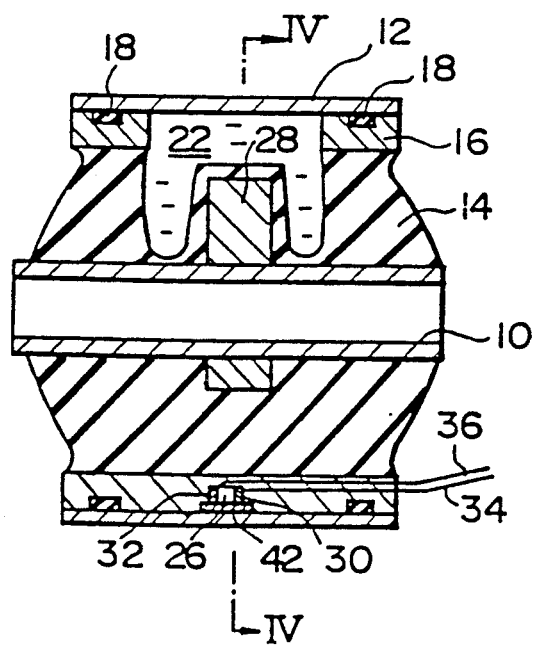
FIG. 5 is a sectional view taken along line V—V of FIG. 4.

Next, FIGS. 4 and 5 show a second embodiment of the present invention.

This embodiment includes an electrically insulating plate 42 disposed between the restricted path 26 and the outer casing 12, in addition to the first embodiment's structure. Thus, this embodiment permits the electrode plates 30 and 32 to be insulated even when the outer casing 12 is made of an electrically conductive material.

Figure 6:
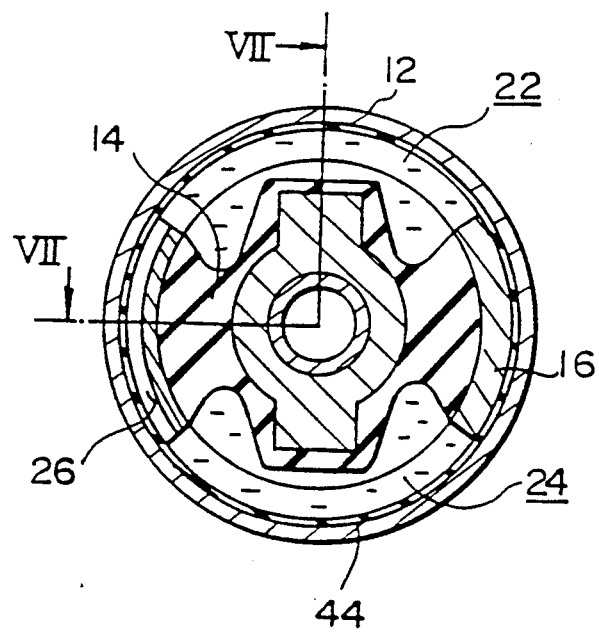
FIG. 6 is a transverse sectional view showing a third embodiment of the invention (corresponding to a sectional view taken along line VI—VI of FIG. 7)
Figure 7:
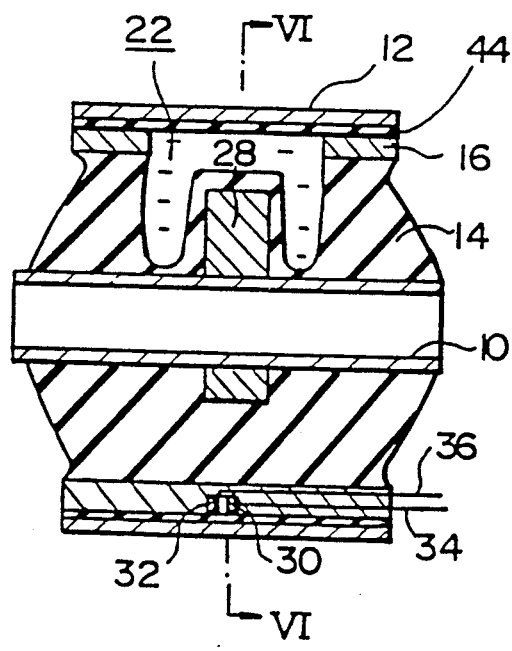
FIG. 7 is a sectional view taken along line VII—VII of FIG. 6.

Next, FIGS. 6 and 7 show a third embodiment of the present invention.

This embodiment includes an elastic member 44 disposed between the outer periphery of the intermediate cylinder 16 and the inner periphery of the outer casing 12. The elastic member 44 may be bonded onto the outer periphery of the intermediate cylinder 16 beforehand and thereafter the resultant assembly may be press-fitted into the inner periphery of the outer casing 12. Alternatively, the outer casing 12 may be made with somewhat greater dimensions and thereafter fitted over the resultant assembly and fixed thereto by caulking. Conversely, the elastic member 44 may be bonded onto the inner periphery of the outer casing 12 beforehand and thereafter the resultant assembly may be press-fitted over the outer periphery of the intermediate cylinder 16. In any case, it is preferable to contact the axial ends of the outer casing 12 to caulk it onto the intermediate cylinder 16.

Accordingly, if a non-conductive material is used as the elastic member, this embodiment also permits the electrode plates 30 and 32 to be insulated even when the outer casing 12 is made of a conductive material, and gives reliable sealing to the liquid chambers.

Figure 8:
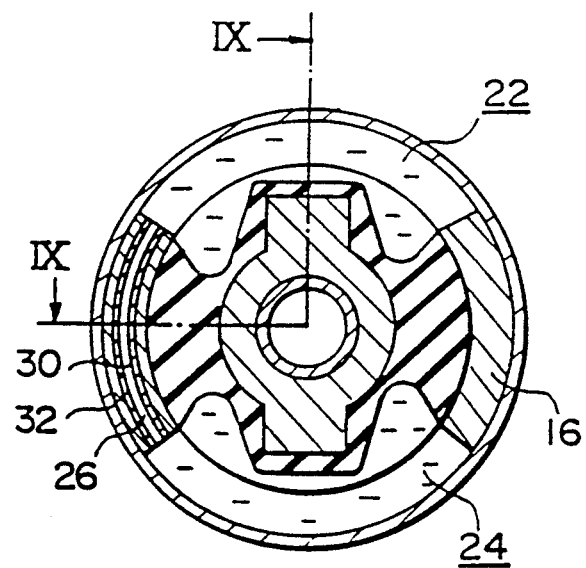
FIG. 8 is a transverse sectional view showing a fourth embodiment of the invention (corresponding to a sectional view taken along line VIII—VIII of FIG. 7)
Figure 9:
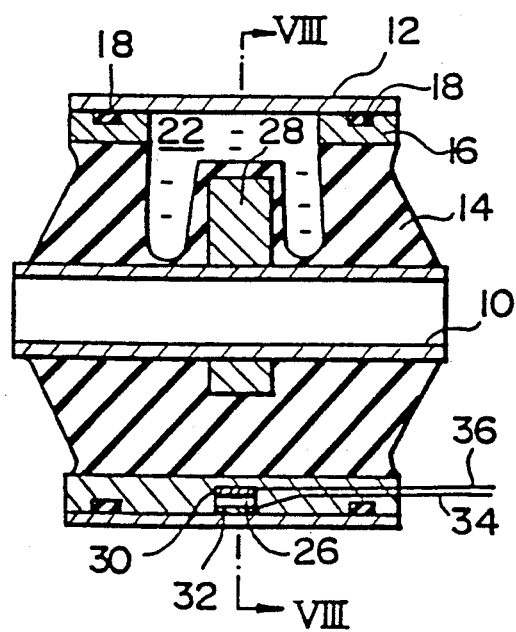
FIG. 9 is a sectional view taken along line IX—IX of FIG. 8.

Next, FIGS. 8 and 9 show a fourth embodiment of the present invention.

In this embodiment, the electrode plates 30 and 32 provided in the restricted path 26 are disposed, not on both sides in the widthwise direction, but on the bottom of the path 26 near the shaft 10 and the top of the path 26 near the outer casing 12. Thus, if the intermediate cylinder 16 is made of an insulating material, this embodiment permits the electrode plates 30 and 32 to be insulated even when the outer casing 12 is made of conductive material.

Figure 10:
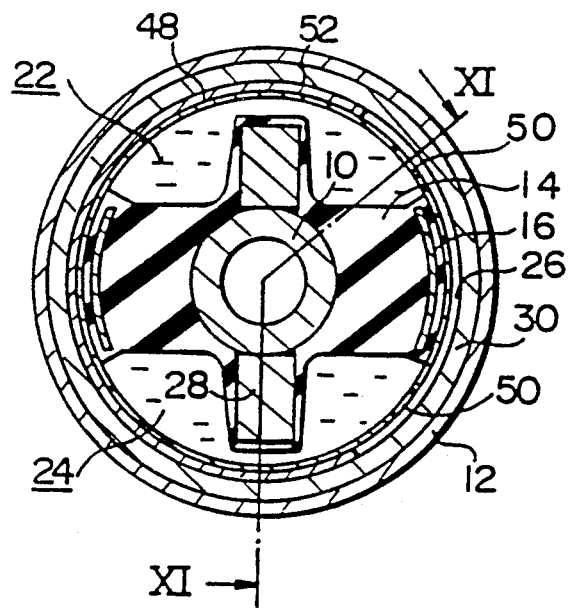
FIG. 10 is a transverse sectional view showing a fifth embodiment of the invention (corresponding to a sectional view taken along line X—X of FIG. 11)
Figure 11:
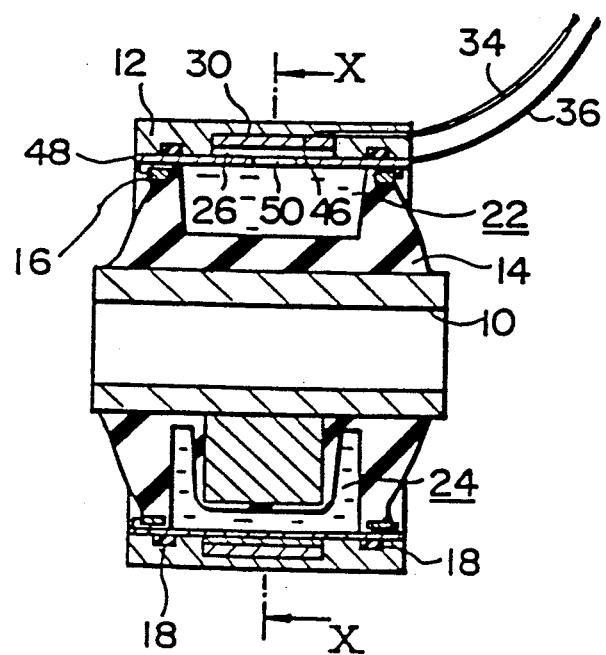
FIG. 11 is a sectional view taken along line XI—XI of FIG. 10.

FIGS. 10 and 11 show a fifth embodiment of the present invention.

In this embodiment, the outer casing 12 is formed in its inner periphery with a ring groove 46, so that a restricted path 26 is defined between the ring groove 46 and the outer periphery of a cylindrical member 48 which is press-fitted into the inner periphery of the outer casing 12. In addition, on the bottom of the ring groove 46 is disposed an electrode plate 30 which is connected to the lead wire 34.

The cylindrical member 48 is provided with circular holes 50 which are respectively associated with the small liquid chambers 22 and 24, so that the restricted path 26 is in communication with the small liquid chambers 22 and 24. A spacer 52 is inserted to fill the unnecessary gap between the ring groove 46 and the cylindrical member 48.

In addition, the cylindrical member 48 is connected to the lead wire 36 so that the cylindrical member 48 serves as the other electrode.

This embodiment also has a feature in that the outer periphery of the intermediate cylinder 16 is covered with part of the elastic member 14 so that that part ensures reliable sealing between the outer periphery of the intermediate cylinder 16 and the inner periphery of the cylindrical member 48.

Figure 12:
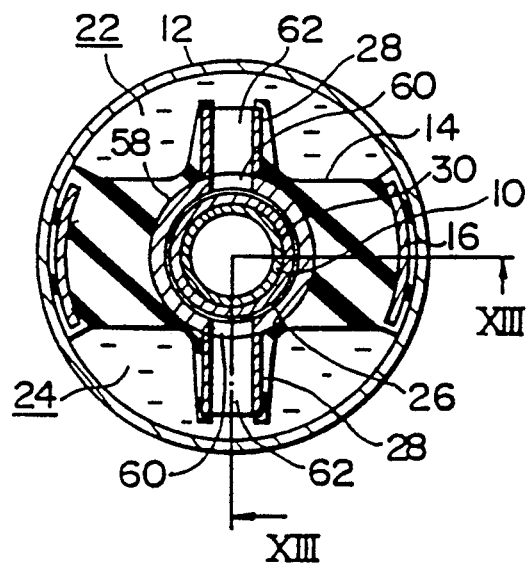
FIG. 12 is a transverse sectional view showing a sixth embodiment of the invention (corresponding to a sectional view taken along line XII—XII of FIG. 13)
Figure 13:
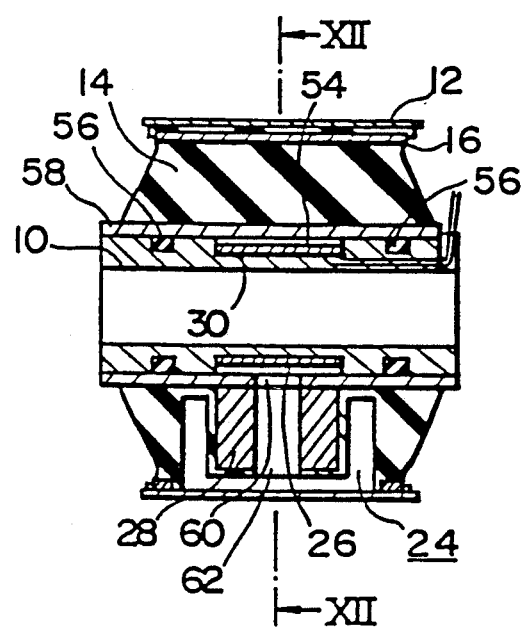
FIG. 13 is a sectional view taken along line XIII—XIII of FIG. 12.

Next, FIGS. 12 and 13 show a sixth embodiment of the present invention.

In this embodiment, the shaft 10 is made of a synthetic resin or ceramic which is an electrically insulating material. The shaft 10 is formed in its outer periphery with a ring groove 54 so that a restricted path 26 is defined between the ring groove 54 and a second intermediate cylinder 58 which is press-fitted over the outer periphery of the shaft 10 with an O-ring 56 therebetween. In addition, the second intermediate cylinder 58 is formed with openings 60 which communicate with the restricted path 26. The openings 60 in turn communicate with through-holes 62 formed in the stopper 28. Accordingly, the restricted path 26 communicates with small liquid chambers 22 and 24 through the openings 60 and the through-holes 62.

The electrode plate 30 of this embodiment is mounted on the bottom of the ring groove 54. The intermediate cylinder 58 serves as the other electrode plate.

In addition, this embodiment is similar to the previous embodiment in that the outer periphery of the intermediate cylinder 16 is covered with part of the elastic member 14 so that that part ensures reliable sealing between the outer periphery of the intermediate cylinder 16 and the inner periphery of the outer casing 12.

Figure 14:
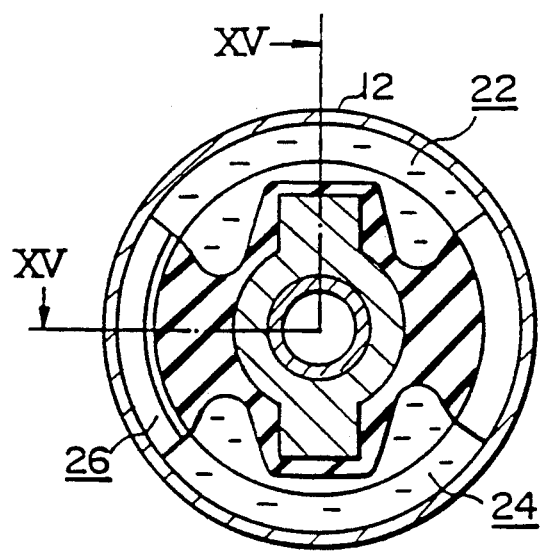
FIG. 14 is a transverse sectional view showing a seventh embodiment of the invention (corresponding to a sectional view taken along line XIV—XIV of FIG. 15)
Figure 15:
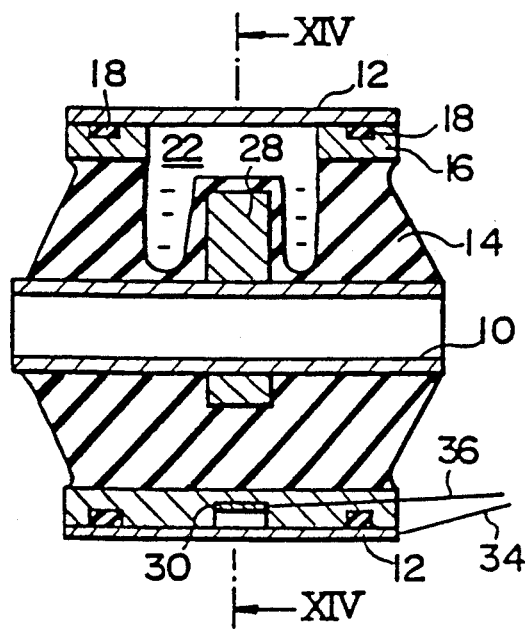
FIG. 15 is a sectional view taken along line XV—XV of FIG. 14.

Next, FIGS. 14 and 15 show a seventh embodiment of the present invention. In this embodiment, the electrode plate 32 of the fourth embodiment is omitted and thus the outer casing 12, made of a conductive material, serves as the other electrode plate.

Figure 16:
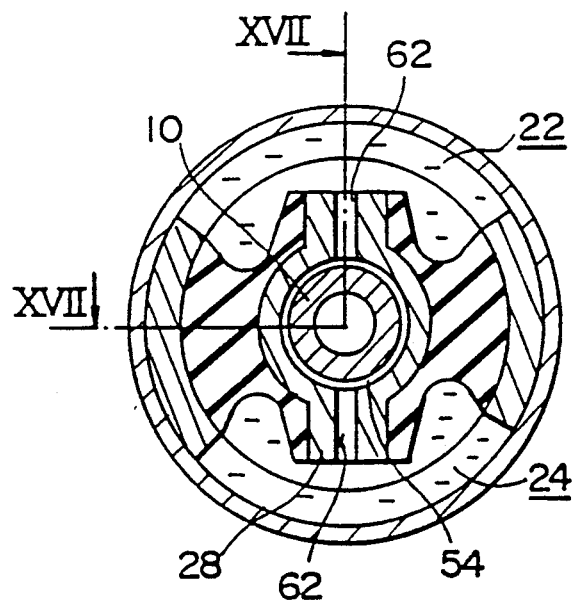
FIG. 16 is a transverse sectional view showing an eighth embodiment of the invention (corresponding to a sectional view taken along line XVI—XVI of FIG. 17)
Figure 17:
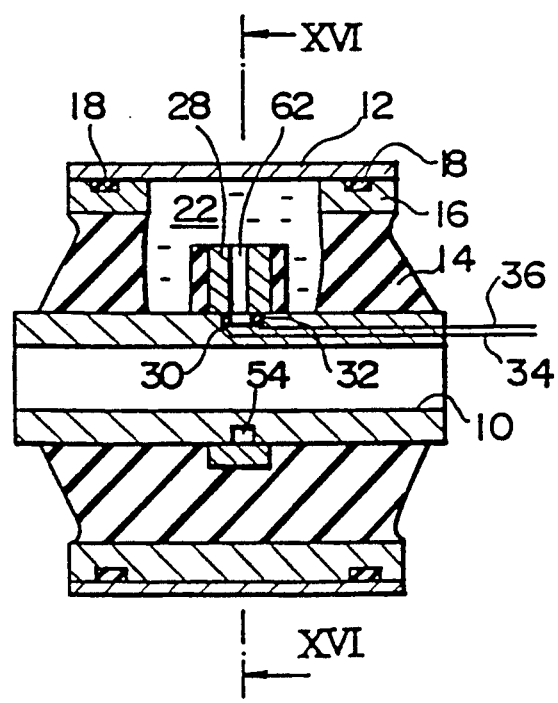
FIG. 17 is a sectional view taken along line XVII—XVII of FIG. 16.

Next, FIGS. 16 and 17 show an eighth embodiment of the present invention. In this embodiment, the small liquid chambers 22 and 24 are in communication with each other through a ring groove 54 formed in the outer periphery of the shaft 10 and through-holes 62 passing through the stopper 28, in the same way as in the sixth embodiment described above, with the difference that the electrode plates 30 and 32 of this embodiment are disposed on both sides of the ring groove 54.

Figure 18:
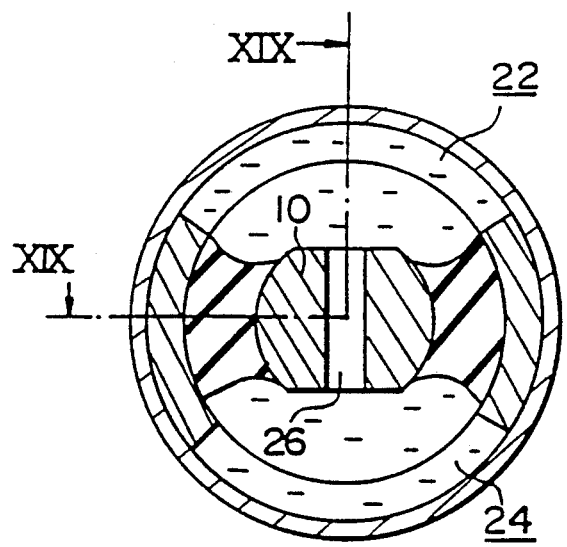
FIG. 18 is a transverse sectional view showing a ninth embodiment of the invention (corresponding to a sectional view taken along line XVIII—XVIII of FIG. 19)
Figure 19:
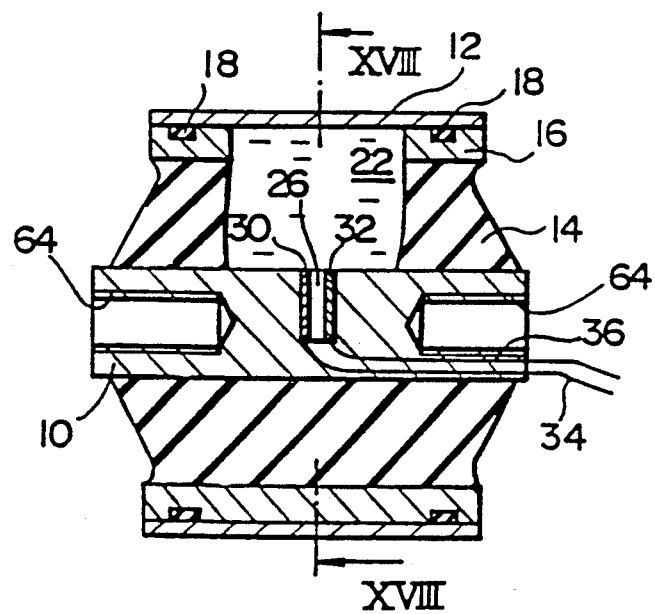
FIG. 19 is a sectional view taken along line XIX—XIX of FIG. 18.

Next, FIGS. 18 and 19 show a ninth embodiment of the present invention.

In this embodiment, a restricted path 26 is defined by a through-hole formed in the shaft 10, the electrode plates 30 and 32 being disposed in the restricted path 26. Thus it is not necessary, unlike in the first embodiment, to form the restricted path 26 in the outer periphery of the intermediate cylinder 16.

However, the shaft 10 cannot be made cylindrical, like it is in the first embodiment, so each end of the shaft 10 is formed with a threaded hole 64 with which a threaded shaft projecting from the base (not shown) is adapted to be engaged.

Figure 20:
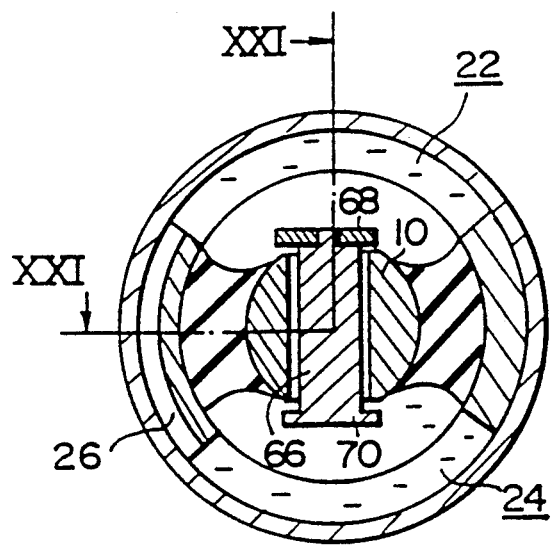
FIG. 20 is a transverse sectional view showing a tenth embodiment of the invention (corresponding to a sectional view taken along line XX—XX of FIG. 21)
Figure 21:
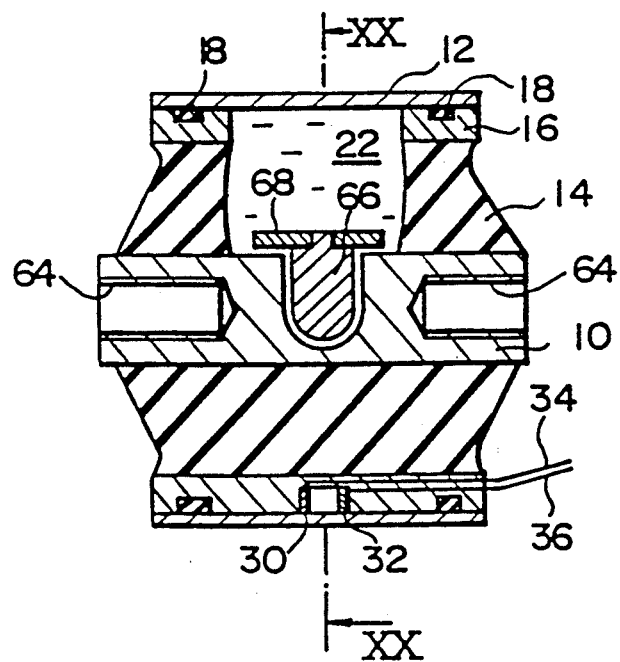
FIG. 21 is a sectional view taken along line XXI—XXI of FIG. 20.

Next, FIGS. 20 and 21 show a tenth embodiment of the present invention.

This embodiment includes a vibration shaft 66 passing diametrically through the shaft 10. The vibration shaft 66 has ends 68 and 70 which widen in the small liquid chambers 22 and 24, respectively. In addition, the distance between the widened portions 68 and 70 is slightly greater than the outer diameter of the shaft 10.

Thus, in this embodiment, the vibration shaft 66 vibrates in the radial direction of the shaft 10 with very small vibrations so that vibrations of a certain frequency can be absorbed thereby.

The rest of the structure is similar to that of the first embodiment.

The vibration shaft 66 may be mounted not in the shaft 10 but on the outer casing 12.

Figure 22:
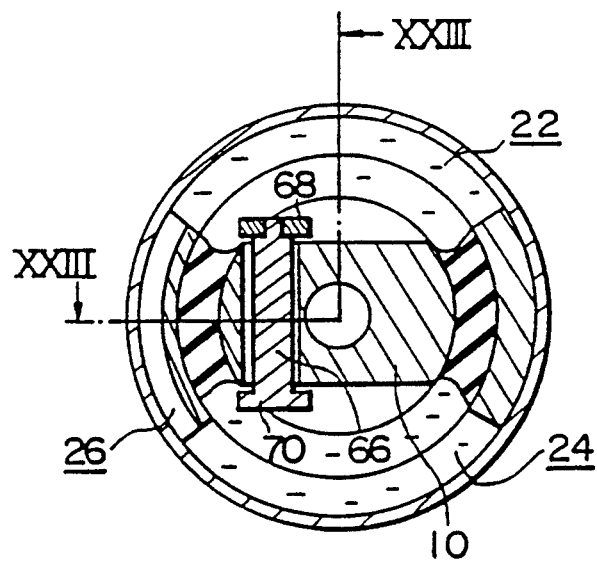
FIG. 22 is a transverse sectional view showing an eleventh embodiment of the invention (corresponding to a sectional view taken along line XXII—XXII of FIG. 23)
Figure 23:
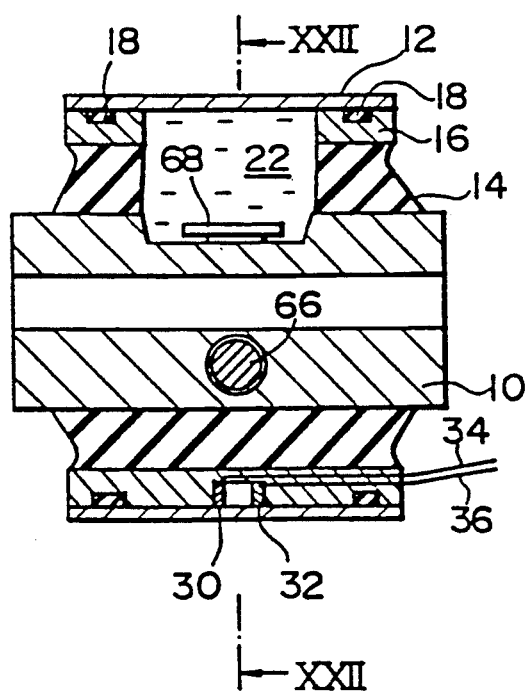
FIG. 23 is a sectional view taken along line XXIII—XXIII of FIG. 22.

Next, FIGS. 22 and 23 show an eleventh embodiment of the present invention.

This embodiment has a difference in that the vibration shaft 66 of the previous embodiment is formed so as to be eccentric with respect to the center axis of the shaft 10, so that the shaft 10 can be made hollow to permit the mounting shaft to pass through the center of the hollow shaft 10.

Figure 24:
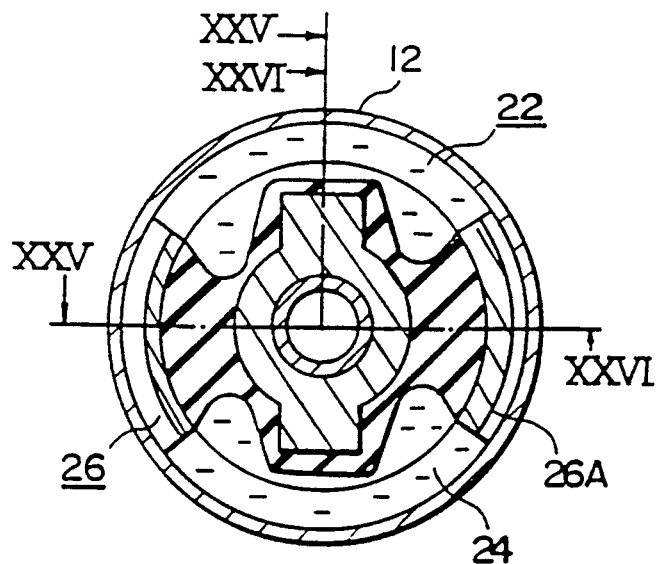
FIG. 24 is a transverse sectional view showing a twelfth embodiment of the invention (corresponding to a sectional view taken along line XXIV—XXIV of FIG. 25 or a sectional view taken along line XXIV—XXIV of FIG. 26)
Figure 25:
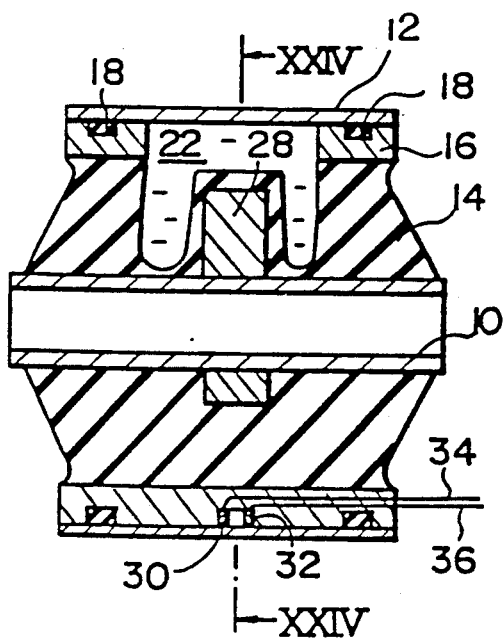
FIG. 25 is a sectional view taken along line XXV—XXV of FIG. 24.
Figure 26:
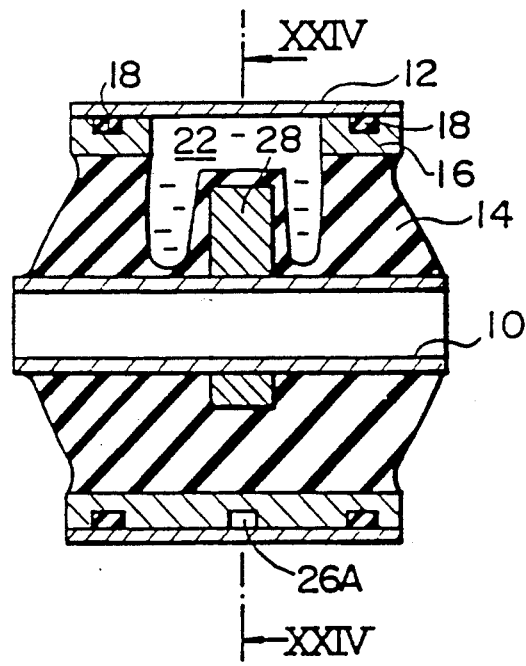
FIG. 26 is a sectional view taken along line XXVI—XXVI of FIG. 24.
Figure 27:
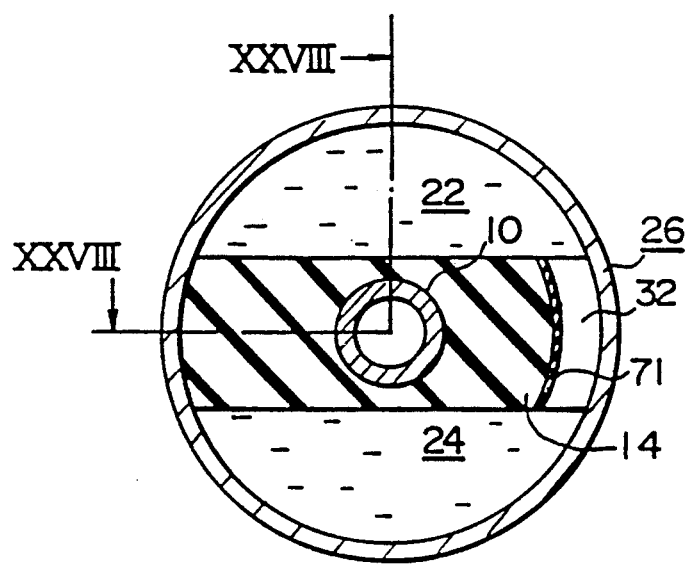
FIG. 27 is a transverse sectional view showing a thirteenth embodiment of the invention (corresponding to a sectional view taken along line XXVII—XXVII of FIG. 28)
Figure 28:
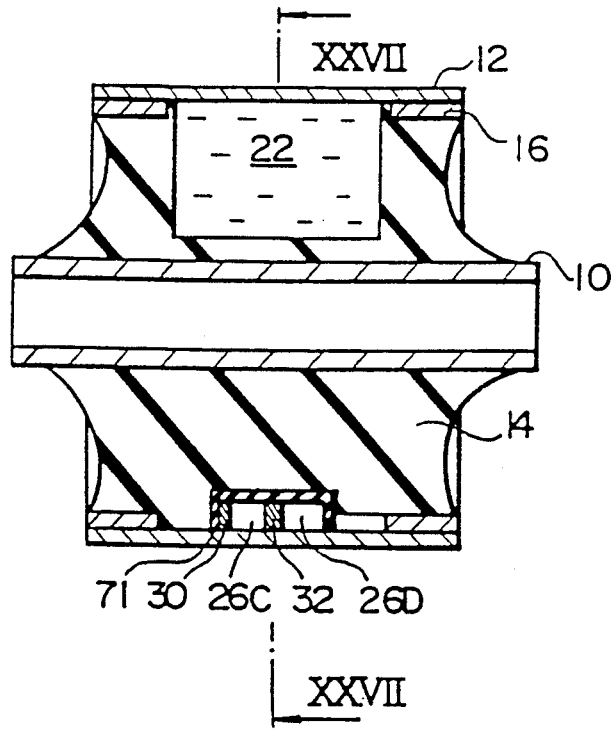
FIG. 28 is a sectional view taken along line XXVIII—XXVIII of FIG. 27.
Figure 29:
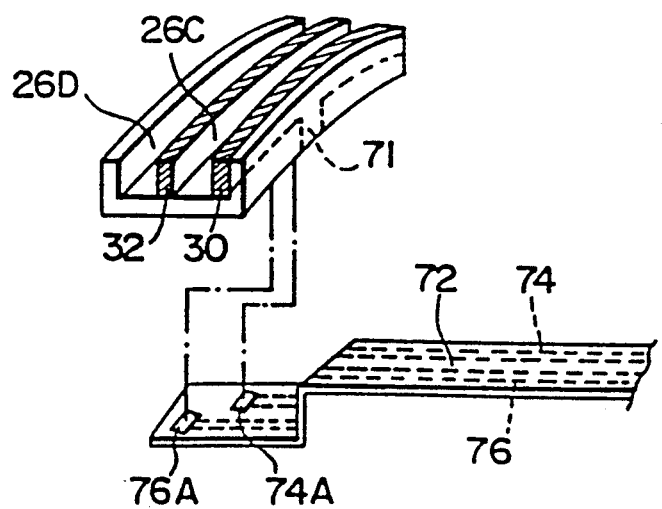
FIG. 29 is an exploded perspective view showing the relation between the electrodes and an electrically conductive film in the thirteenth embodiment.

Next, FIGS. 24 to 26 show a twelfth embodiment of the present invention.

In this embodiment, in addition to the restricted path 26 of the first embodiment, another restricted path 26A is formed in a diametrically-opposite position in the outer periphery of the intermediate cylinder 16, so that the small liquid chambers 22 and 24 are in communication with each other through the restricted paths 26 and 26A. It must be noted however that the electrode plates 30 and 32 of this embodiment are disposed only in the restricted path 26: that is, the other restricted path 26A has no electrode plates. Thus, the viscosity of the electrorhelogic fluid can only be changed in the restricted path 26.

Next, FIGS. 27 to 30 show a thirteenth embodiment of the present invention.

In this embodiment, an insulating plate 71 having a U-shaped cross section is disposed inside the restricted path 26 which permits the small liquid chambers 22 and 24 to be in communication with each other. Electrode plates 30 and 32 are disposed at one edge and the center, respectively, in the widthwise direction of the insulating plate 71. Thus, the interior of the restricted path 26 is divided by the electrode plate 32 into restricted paths 26C and 26D through which the small liquid chambers 22 and 24 are in communication with each other.

Figure 30:
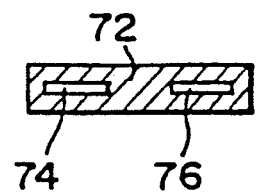
FIG. 30 is a sectional view of the film.

A film 72 which electrically activates the electrodes 30 and 32 is provided with conductive members 74 and 76 passing through its interior, as shown in FIG. 30. The film 72 is embedded in the elastic member 14 so that the current is supplied through exposed portions 74A and 76A of the conductive members 74 and 76. The film 72 can be vulcanized to the elastic member 14. Even if the elastic member 14 is deformed, stress concentrations around the film 72 are lower.

However, it is preferable that the intermediate cylinder 16 be made of an insulating material such as a synthetic resin or ceramic and the film 72 be buried in that intermediate cylinder 16 to ensure reliable insulation.

Accordingly, in this embodiment, electrical activation of the electrode plates 30 and 32 causes the viscosity of the electrorhelogic fluid in the restricted path 26C to vary to change the fluid resistance to flow through the restricted path 26C, whereas the electrorheologic fluid in the other restricted path 26D always has a constant resistance, irrespective of the voltage applied to the electrodes.

Figure 31A:
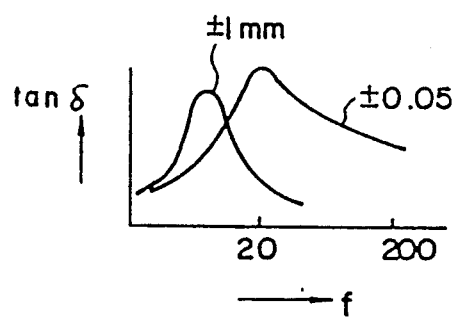
FIGS. 31(A)-31(D) are is graphs indicating tan δ and the ratio of dynamic spring constant to static spring constant for vibration frequencies under electrically activated and electrically inactivated conditions.
Figure 31C:
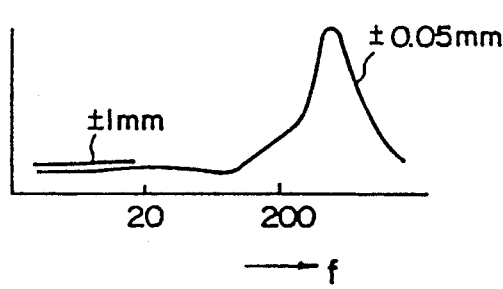
Figure 31B:
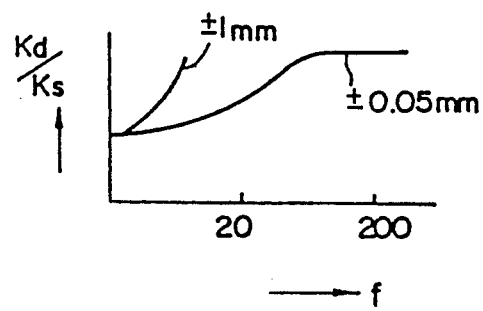
Figure 31D:
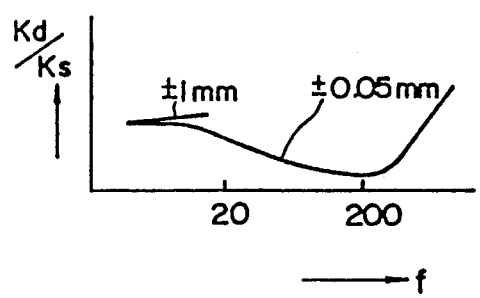

FIG. 31(A) shows the loss factor, tan δ, and FIG. 31(B) shows the ratio of dynamic spring constant Kd to static spring constant Ks obtained when this embodiment is activated; FIG. 31(C) shows the loss factor, tan δ, and FIG. 31(D) shows the ratio of dynamic spring constant Kd to static spring constant Ks obtained when this embodiment is inactivated. It can be appreciated from these graphs that a lower dynamic/static spring constant ratio and a remarkably reduced level of internal sound are obtained for high frequencies around 200 Hz when this embodiment is used in the front suspension of an automobile, during-high speed running with electrically inactivated electrodes. When the shimmy phenomenon appears, the electrodes are electrically activated so that the electrorheologic fluid in the restricted path 26C is solidified to permit the fluid to flow only in the other restricted path 26D, resulting in greater loss of vibrations with lower frequencies and higher amplitudes, leading to a reduction in shimmy.

It must be noted that the lead wires 34 and 36 described in each of the above embodiments are not limited to those buried in the shaft 10, the outer casing 12, or the stopper 28, but may be arranged in contact with them, may be held in grooves formed in them, or may be protected by being covered with a protective material.

What is claimed is:

1. An anti-vibration bush comprising:
    an outer casing adapted to be mounted on one of a vibration generating member or a vibration receiving member;
    a shaft disposed in said outer casing and adapted to be mounted on the other of said vibration generating member and said vibration receiving member;
    a first elastic member disposed between said outer casing and said shaft and defining a plurality of liquid chambers arranged inside of the outer casing between said first elastic member and an inner surface of said outer casing;
    an electrorheologic fluid filling said liquid chambers and having a viscosity which varies with an electric field applied thereto;
    an intermediate cylinder disposed between said outer casing and said first elastic member, and partially defining said liquid chambers along with said first elastic member and said outer casing;
    a restricted narrow path formed radially inside said outer casing comprised of a groove along an arc of the circumference of said intermediate cylinder for permitting said liquid chambers to be in communication with each other; and
    electrode means formed in an arc-shape, and including a pair of narrow electrode plates disposed in parallel and positioned in said restricted narrow path for electrically activating said electrorheologic fluid, whereby vibration over a wide range of intensity and frequency is controlled by adjusting of the viscosity of said electrorheologic fluid by varying the electric field.

2. An anti-vibration bush according to claim 1, wherein said restricted narrow path is defined by said outer casing and a groove which is formed in the circumferential direction in the outer periphery of said intermediate cylinder.

3. An anti-vibration bush according to claim 2, wherein said pair of electrode plates are oppositely disposed along opposite side walls of said groove.

4. An anti-vibration bush according to claim 3, further comprising an arc-shaped electrically insulating plate provided along an edge of said electrode means, and disposed between said groove and an inner wall of said outer casing to insulate said electrode means from said outer casing.

5. An anti-vibration bush according to claim 3, further comprising a cylindrical second elastic member disposed between an outer periphery of said intermediate cylinder and the inner periphery of said outer casing.

6. An anti-vibration bush according to claim 2, wherein said pair of narrow electrode plates are oppositely disposed on the bottom of said groove and on the inner periphery of said outer casing, respectively.

7. An anti-vibration bush according to claim 2, wherein said electrode means includes said outer casing serving as one of said narrow electrode plates and another electrode plate disposed on the bottom of said groove.

8. An anti-vibration bush according to claim 2, wherein said shaft is formed with a through-hole passing diametrically therethrough to permit said liquid chambers to be in communication with each other, and a vibration shaft capable of vibrating in an axial direction passes through said through-hole.

9. An anti-vibration bush according to claim 2, wherein said shaft is formed with a through-hole disposed so as to be eccentric with respect to the central axis of said shaft to permit said liquid chambers to be in communication with each other, and a vibration shaft capable of vibrating in an axial direction passes through said through-hole.

10. An anti-vibration bush according to claim 2, further comprising another groove formed in the circumferential direction in said intermediate cylinder, wherein said pair of narrow electrode plates are oppositely disposed along two side walls of one of said two grooves.

11. An anti-vibration bush according to claim 10, wherein said two grooves are disposed so as to be opposite to each other with respect to said shaft.

12. An anti-vibration bush according to claim 2, wherein a wall of said groove is provided with an insulating plate, and said electrode means includes a first electrode plate disposed in close contact with one side wall of said insulating plate and a second electrode plate disposed at the center in the widthwise direction of said insulating plate so that said restricted narrow path is divided into two paths by said second electrode plate.

13. An anti-vibration bush according to claim 1, wherein said restricted narrow path is defined by said intermediate cylinder and an annular groove formed in the circumferential direction in the inner periphery of said outer casing, and said electrode means includes said intermediate cylinder serving as one of said narrow electrode plates and another electrode plate disposed on the bottom of said annular groove.

14. An anti-vibration bush adapted to be disposed between a vibration generating member and a vibration receiving member, comprising:

a cylindrical outer casing adapted to be mounted on one of said vibration generating member or said vibration receiving member;
a shaft disposed at a central axis of said cylindrical outer casing and adapted to be mounted on the other of said vibration generating member and said vibration receiving member;
an elastic member disposed between said cylindrical outer casing and said shaft and defining two small liquid chambers arranged inside the outer casing between said elastic member and an inner surface of said outer casing;
an intermediate cylinder disposed between said outer casing and said elastic member, and partially defining said small liquid chambers along with said elastic member and said outer casing;
an electrorheologic fluid filling said small liquid chambers and having a viscosity which varies with an electric field applied thereto;
a restricted narrow path formed radially inside said cylindrical outer casing comprised of a groove along an arc of the circumference of at least one of said cylindrical outer casing and said intermediate cylinder, for permitting said two small liquid chambers to be in communication with each other; and
a pair of narrow electrodes formed in an arc-shape and disposed in parallel in said restricted path so as to electrically activate said electrorheologic fluid, whereby the vibration over a wide range of intensity and frequency is controlled by adjusting the viscosity of said electrorheologic fluid by varying the electric field.

15. An anti-vibration bush according to claim 14, wherein said restricted narrow path is defined by said cylindrical outer casing and a groove formed in the circumferential direction in said intermediate cylinder.

16. An anti-vibration bush according to claim 15, wherein said pair of electrodes are disposed in close contact on opposite walls of said restricted narrow path, respectively.

* * * * *